(12) United States Patent
Smith et al.

(10) Patent No.: US 8,886,929 B2
(45) Date of Patent: Nov. 11, 2014

(54) GENERATING A CHAIN OF TRUST FOR A VIRTUAL ENDPOINT

(75) Inventors: Ned M. Smith, Beaverton, OR (US); Palanivel Rajan Shanmugavelayutham, San Jose, CA (US); Rao Pitla, Beaverton, OR (US); Ioan E. Scumpu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 2203 days.

(21) Appl. No.: 11/392,404

(22) Filed: Mar. 29, 2006

(65) Prior Publication Data

US 2007/0230504 A1    Oct. 4, 2007

(51) Int. Cl.
| | |
|---|---|
| H04L 29/06 | (2006.01) |
| G06F 21/57 | (2013.01) |
| G06F 21/56 | (2013.01) |
| G06F 21/53 | (2013.01) |
| G06F 9/455 | (2006.01) |

(52) U.S. Cl.
CPC ...... *G06F 21/53* (2013.01); *G06F 2009/45587* (2013.01); *G06F 21/572* (2013.01); *G06F 21/566* (2013.01); *G06F 9/45558* (2013.01)
USPC ............................. 713/157; 370/469; 370/252

(58) Field of Classification Search
USPC ........................................................ 713/157
See application file for complete search history.

(56) References Cited

U.S. PATENT DOCUMENTS

| | | | | |
|---|---|---|---|---|
| 5,836,013 | A * | 11/1998 | Greene et al. ..................... | 713/2 |
| 7,055,026 | B2 * | 5/2006 | Gere ............................. | 713/100 |
| 7,313,681 | B2 * | 12/2007 | Chen et al. ....................... | 713/2 |
| 7,313,685 | B2 * | 12/2007 | Broyles et al. ................... | 713/2 |
| 7,516,331 | B2 * | 4/2009 | Jin et al. ........................ | 713/187 |
| 2007/0179904 | A1 * | 8/2007 | Hofstee et al. .................. | 705/67 |

OTHER PUBLICATIONS

Rajan Palanivel, Virtual Machines Xen and Terra, 2004, http://www.thefengs.com/wuchang/work/courses/cse525_winter2004/summaries/18/slides.ppt.*
Tal Garfinkel et al., Terra: A Virtual Machine-Based Platform for Trusted Computing, Oct. 2003, ACM.*
Hiroshi Maruyama et al., Trusted Platform on demand (TPod), Feb. 2004.*
Reiner Sailer et al., Design and Implementation of a TCG-Based Integrity Measurement Architecture, Jan. 2004, IBM.*
Ramachandran et al., "New Client Virtualization Usage Models Using Intel Virtualization Technology," Intel Technology Journal, vol. 10, Issue 3, 2006, pp. 205-216.
Neiger et al., "Intel Virtualization Technology: Hardware Support for Efficient Processor Virtualization," Intel Technology Journal, vol. 10, Issue 3, 2006, pp. 167-178.
Abramson et al., "Intel Virtualization Technology for Directed I/O," Intel Technology Journal, vol. 10, Issue 3, 2006, pp. 179-192.

(Continued)

*Primary Examiner* — Fikremariam A Yalew
(74) *Attorney, Agent, or Firm* — Trop, Pruner & Hu, P.C.

(57) ABSTRACT

A method includes generating a chain of trust for a virtual endpoint. The virtual endpoint is associated with a layered architecture that includes layers, which include a physical layer. For each layer, a code image of a process of the layer is measured before the process is loaded to form a node of the chain of trust.

20 Claims, 8 Drawing Sheets

(56) References Cited

OTHER PUBLICATIONS

Dong et al., "Extending Xen with Intel Virtualization Technology," Intel Technology Journal, vol. 10, Issue 3, 2006, pp. 193-204.

Neumann et al., "Intel Virtualization Technology in Embedded and Communications Infrastructure Applications," Intel Technology Journal, vol. 10, Issue 3, 2006, pp. 217-226.

Fabian et al., "Virtualization in the Enterprise," Intel Technology Journal, vol. 10, Issue 3, 2006, pp. 227-242.

Casazza et al., "Redefining Server Performance Characterization for Virtualization Benchmarking," Intel Technology Journal, vol. 10, Issue 3, 2006, pp. 243-252.

* cited by examiner

GENERATING A CHAIN OF TRUST FOR A VIRTUAL ENDPOINT

BACKGROUND

The invention generally relates to generating a chain of trust for a virtual endpoint.

Due to ever-increasing processing speeds of modern servers, traditional multiple server functions may be consolidated using a virtual environment. In the virtual environment, a virtual machine monitor (VMM) creates virtual machines that are essentially self-contained platforms, as each virtual machine has its own instance of an operating system stack. The virtual machines may therefore, as an example, function as independent servers, while remaining isolated from each other.

Besides increasing server utilization, the virtual environment may be advantageous in other aspects. For example, the virtual machines are isolated from software faults. Therefore, duplicate virtual machines may serve as redundant database servers, with one of the servers being the active server and the other being the backup server. The software isolation that is provided by the virtual environment also thwarts security threats from propagating among the virtual machines.

Referring to FIG. 1, a particular virtual machine may desire to connect to or communicate data with an external address space, such as a network 7 (for example), as a client, or virtual endpoint 5. However, connection to the network 7 may not be allowed until the network 7 trusts the endpoint 5 to some degree. To achieve this trust, the endpoint 5 may furnish integrity, or posture, data to a verifier, such as a policy decision point (PDP) 8. The PDP 8 evaluates the posture data to ascertain if the endpoint 5 meets a minimum level of trust for the intended operation or data communication.

For example, the posture data that is provided by the endpoint 5 may indicate such information as the current virus definition file being used by the endpoint 5, the versions of virus and firewall software that are currently executing on the endpoint 5, the patch levels of certain software executing on the endpoint 5, etc. If the posture data does not reveal criteria that is required for connection to the network 7, then the PDP 8 may refuse the connection; or alternatively, the PDP 8 may refer the endpoint 5 to a server 12 so that updated software may be downloaded to the to the endpoint 5 to bring the endpoint 5 into compliance.

A potential vulnerability to the above-described trust verification scheme is that a rogue process of the endpoint 5 may be aware of the "correct" posture data to furnish to the PDP 8. For example, the endpoint 5 may be infected with a particular virus that provides posture data to the PDP 8, which incorrectly indicates that the endpoint 5 is immune to the virus.

Thus, there is a continuing need for better ways to establish trust for a virtual endpoint.

DETAILED DESCRIPTION

In accordance with embodiments of the invention described herein, for purposes of gaining trust for connection to another address space, a virtual client, or endpoint, provides posture data, which is grounded in the hardware that establishes the virtual environment for the endpoint. Because the posture data is directly tied to the hardware, the data is more resistant to tampering than the posture data that is provided by conventional trust verification schemes.

More specifically, as described herein, the posture data that is provided by the virtual endpoint includes a logical proof, or "chain of trust," which represents a load time history of the endpoint. The chain of trust is in the form of a transitive trust tree, with the root of trust (i.e., the highest assurance component), which is the top of the transitive trust tree, being grounded in hardware. Lower assurance components are located below the root or trust, in descending level of assurance. This organization allows a verifier who executes the chain of trust to compare the transitive tree to a reference chain of trust to flag the point at which an assurance threshold is exceeded.

As described herein, the posture data that is provided by the virtual endpoint may also include run time measurements, or measurements taken during the execution of hardware and software layers that establish the virtual endpoint. The verifier evaluates the measurement data only after the verifier verifies the chain of trust, in accordance with some embodiments of the invention. From here, the verifier may relatively easily determine if the virtual endpoint is suitable for the intended operation or data.

In some embodiments of the invention, the chain of trust may be provided as meta data, which is parsed by the verifier. The metadata description, along with integrity markers, may be digitally signed by a protected key.

Figure 1:
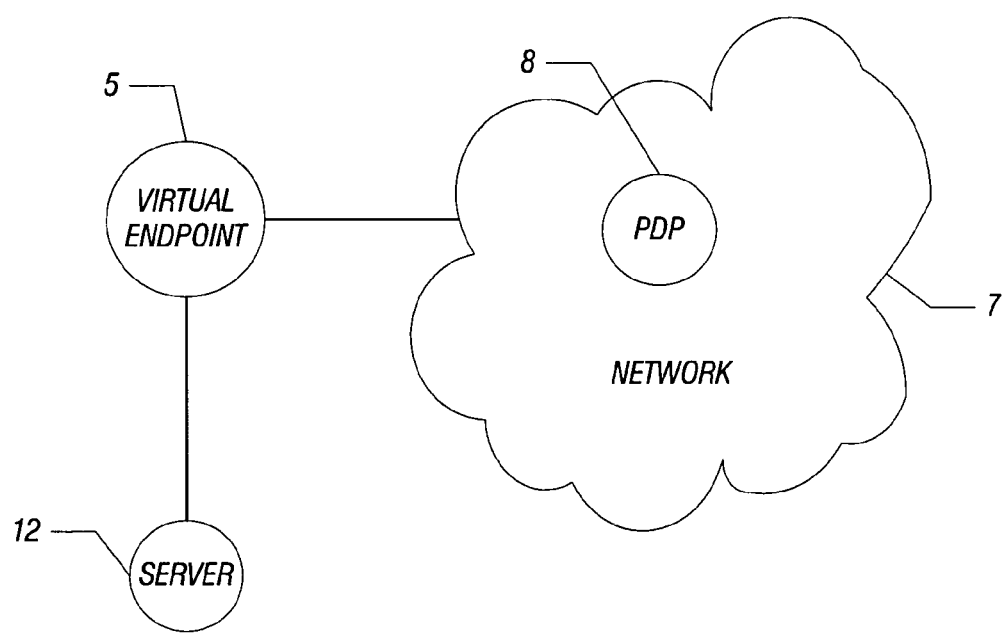
FIG. 1 is an illustration of a conventional scheme to establish trust between a virtual endpoint and a network.
Figure 2:
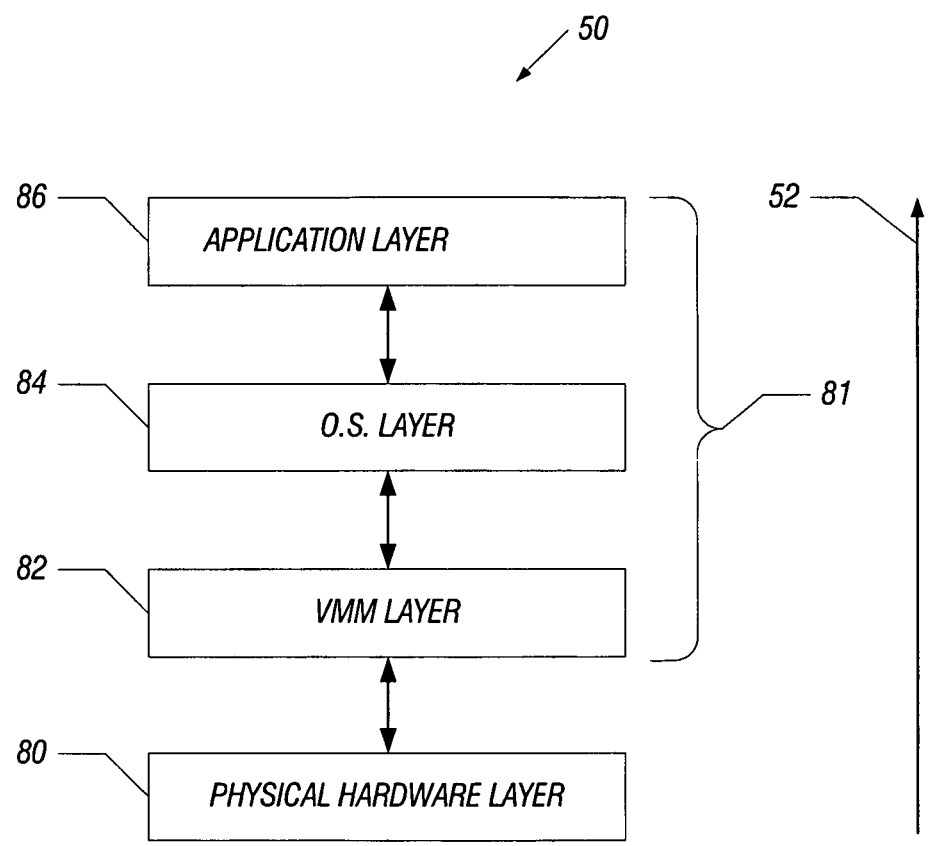
FIG. 2 depicts a layered architecture of a platform according to an embodiment of the invention.

Referring to FIG. 2, the virtual endpoint is created by a virtual machine, a machine that is established by a layered architecture 50 of a platform, such as a server, desktop computer, portable computer, cellular telephone or personal digital assistant (PDA), as just a few examples. In general, the architecture 50 includes a physical hardware layer 80, which represents microprocessor(s), memory (non-volatile and dynamic random access (DRAM) memories, as examples), buses, bridges, input/output (I/O) controllers, a basic input/output system (BIOS), etc. The physical hardware layer 80 is the lowest hierarchical layer of the architecture 50, with higher software layers 81 of the platform being layered in an ordered direction 52 that is depicted in FIG. 2. The software layers 81, which are created and operate via the execution of one or more microprocessors of the physical hardware layer 80, include a virtual machine monitor (VMM) layer 82, operating system layer 84 and an application layer 86.

The VMM layer 82 is located above the physical hardware layer 80 and is responsible for emulating a complete hardware environment for each virtual machine. In general, the VMM layer 82 allocates the hardware resources among the virtual machines. Each virtual machine loads an instance of an operating system stack, a stack that spans operating system 84 and application 86 layers of the architecture 50.

The direction 52 also indicates the order in which the layers are loaded. For example, on bootup of the platform, the physical hardware 80 layer is first initialized, or loaded. Next, the physical hardware layer 80 loads the VMM layer 82. Subsequently, the VMM layer 82 loads the virtual machines, each of which loads an instance of its operating stack.

Figure 3:
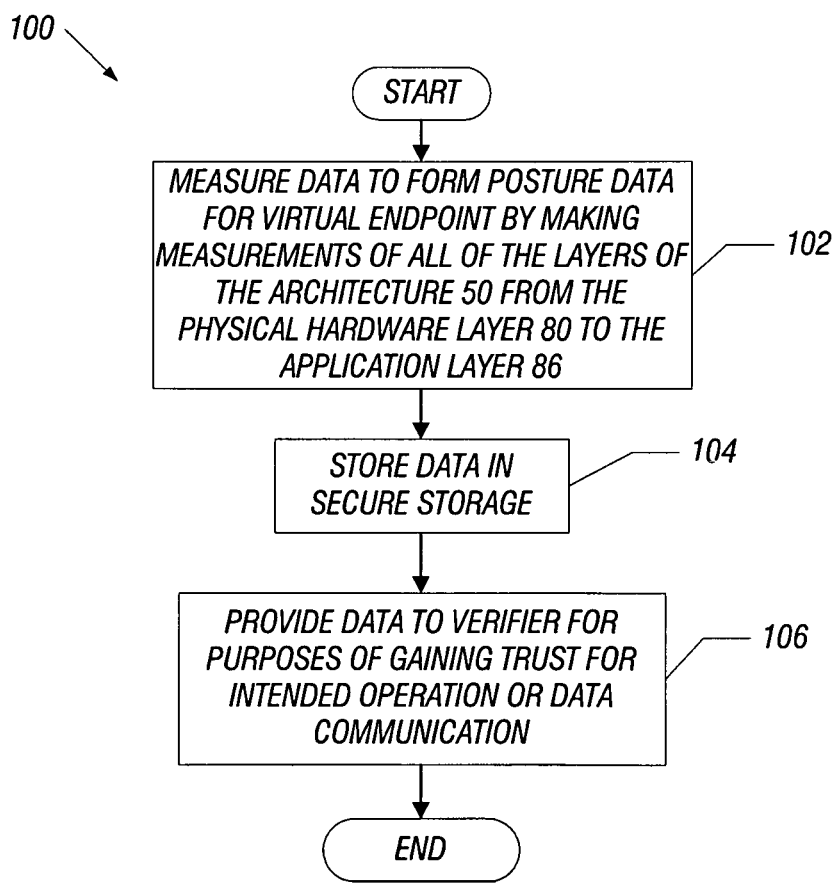
FIG. 3 is a flow diagram depicting a technique to generate and use a chain of trust for a virtual endpoint according to an embodiment of the invention.

FIG. 3 depicts an exemplary technique 100 that may be used by the virtual endpoint in accordance with some embodiments of the invention. Referring to FIG. 3 in conjunction with FIG. 2, measurements are made (block 102) of all of the layers of the platform 50 from the physical hardware layer 80 to the application layer 86. The measured data is stored in a secure storage on the platform 50, pursuant to block 104. The data may then be provided (block 106) to a verifier (such as a policy decision point, for example) for purposes of determining if a sufficient level of trust exists for the intended data communication or operation.

As further described herein, the posture data may include the following: 1.) load time measurements that are taken as the components of the virtual environment are being loaded; and 2.) run time measurements that are taken when the components of the virtual environment are executing, or running.

Figure 4:
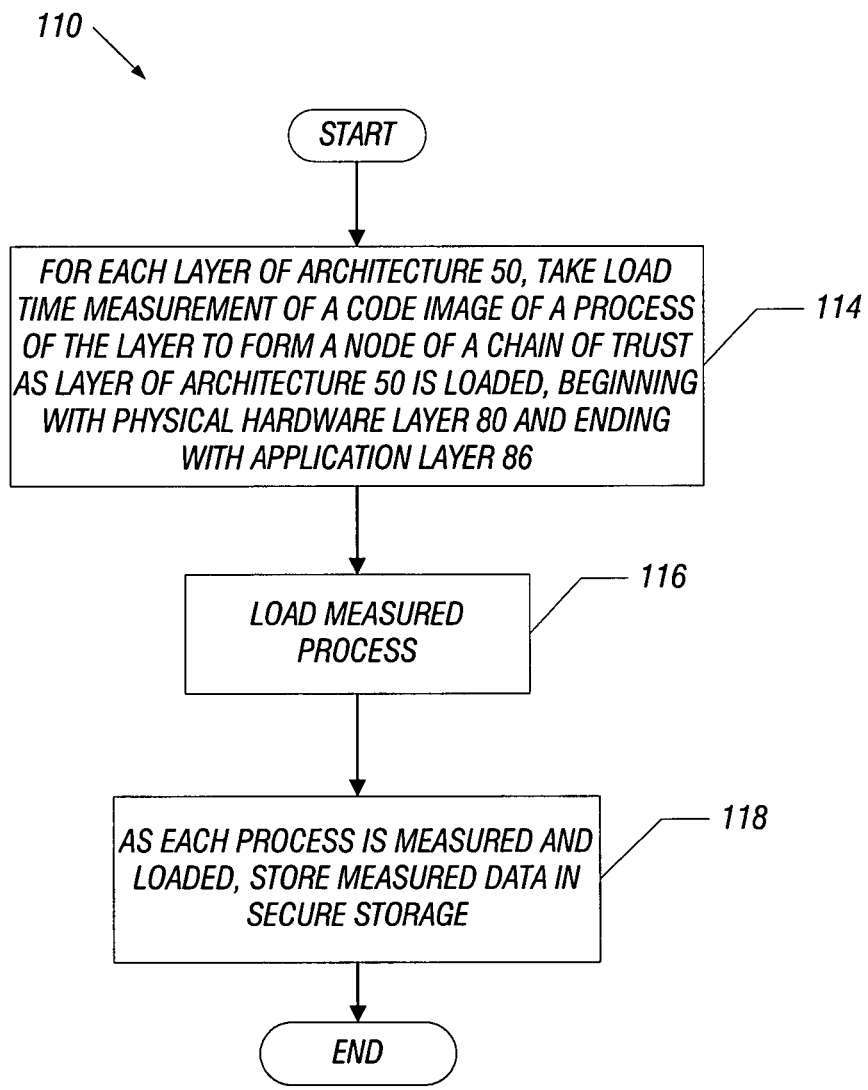
FIG. 4 is a flow diagram depicting a technique to generate load time chain of trust measurements according to an embodiment of the invention.

FIG. 4 depicts a technique 110 that may be used, in general, in accordance with some embodiments of the invention to generate a chain of trust. Referring to FIG. 4 in conjunction with FIG. 2, pursuant to the technique 110, for each layer of the architecture 50, a load time measurement of a code image of a process of the layer is taken (block 114), beginning with the physical hardware layer 80 and ending with the application layer 86. After the measurement is taken, the measured process is loaded, pursuant to block 116.

For example, before the physical layer 80 is initialized, or "loaded," a code image of process (a BIOS process, for example) of the physical layer 80 (such as a measurement of a firmware or microcode image, for example) is taken. This measurement is grounded in hardware and forms the root of the chain of trust. Next, the physical layer 80 measures and then loads a process of the VMM layer 82. Subsequently, the VMM layer 82 measures and then loads a process of the virtual machine. For example, this may involve creating an instance of the operating system stack for the virtual machine and measuring a particular image of the instance. As each process is measured and loaded, the measured data is stored in secure storage, pursuant to block 118 of the technique 110.

Figure 5:
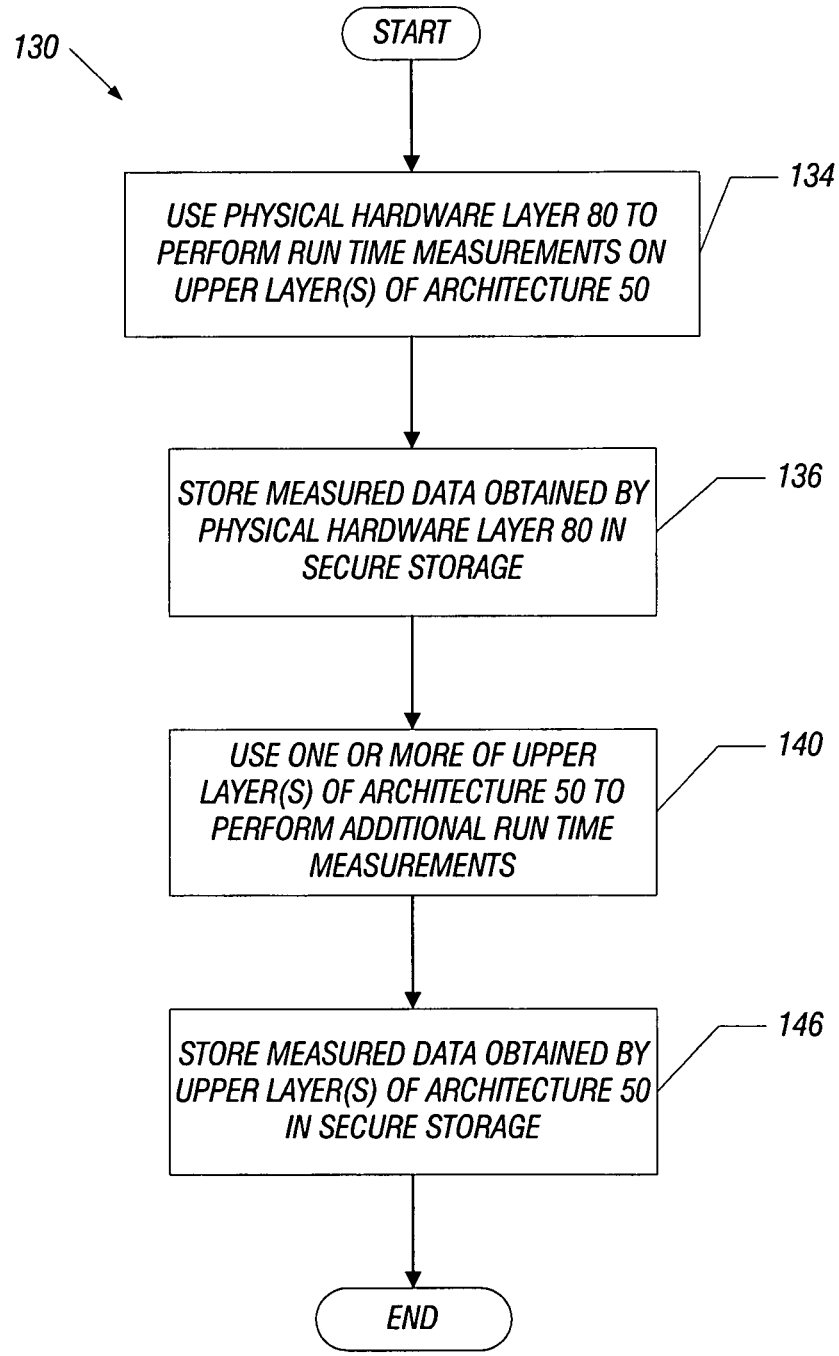
FIG. 5 is a flow diagram depicting a technique to generate run time chain of trust measurements according to an embodiment of the invention.

FIG. 5 depicts a technique 130 that may be used, in general, for purposes of gathering run time measurements. Referring to FIG. 5 in conjunction with FIG. 2, pursuant to the technique 130, the physical hardware layer 80 is used to perform run time measurements on one or more upper layers (such as the VMM layer 82 and/or the operating system layer 84, as examples) of the architecture 50 (block 134). The measured data is then stored (block 136) in secure storage. Next, one or more of the upper layer(s) (such as the operating system layer 84) perform additional run time measurements, pursuant to block 140 and store the measurements in secure storage, as depicted in block 146.

Figure 6:
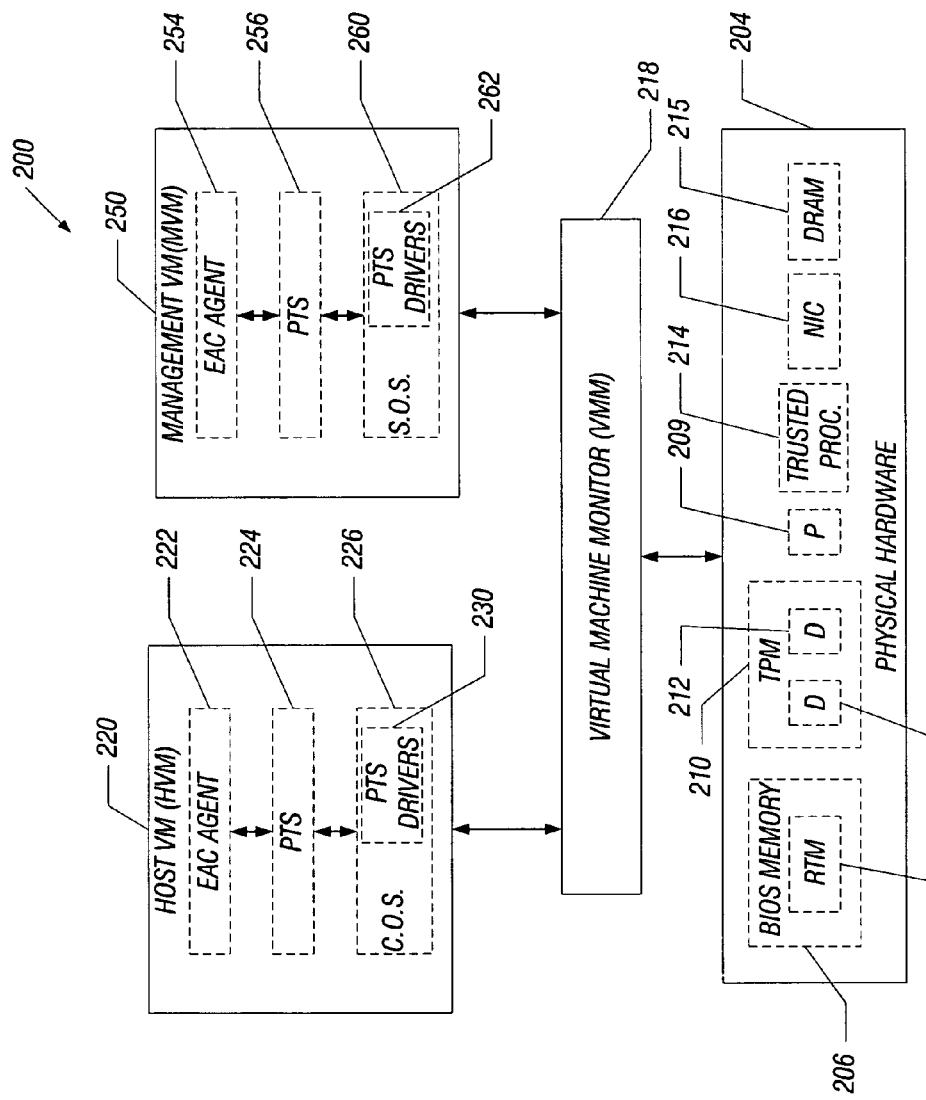
FIG. 6 is a schematic diagram of a platform illustrating the creation of a virtual environment according to an embodiment of the invention.

Referring to FIG. 6, as a more specific example, a platform 200, in accordance with some embodiments of the invention, has a virtual machine monitor (VMM) 218, which establishes a virtual environment for the platform 200. The virtual environment includes guest virtual machines, such as an exemplary host virtual machine 220 (herein called the "HVM 220"). It is noted that the HVM 220 is one out of many possible guest virtual machines of the virtual environment. The virtual environment also includes a management virtual machine 250 (herein called the "MVM 250").

In general, the MVM 250 provides a virtual network connection for the guest virtual machines, such as the HVM 220. The MVM 250 also, in conjunction with the VMM 218 and the physical hardware 204, establish chains of trust for the virtual endpoints of the environment, such as a chain of trust for a virtual endpoint that is created by the HVM 220, as further discussed below in connection with FIGS. 7 and 8.

Still referring to FIG. 6, in accordance with some embodiments of the invention, the MVM 250 and the HVM 220 contain endpoint access control (EAC) components, which are responsible for EAC for the virtual endpoint. In general, EAC is a six step process beginning with collection of configuration and operational status. Step two reports collected values to a verification engine that may be on a remote server or in some other address space. Step three is the evaluation of reported values according to some policy. Step four determines a response or activity to be taken to respond to possible threats and vulnerabilities identified. Step five enforces the response action by configuring enforcement engines appropriately. This may include selection of a pre-provisioned response or directly provisioning the response actions at some enforcement point (such as a policy decision point (PDP)). As an alternative to step five, enforcement may also take the shape of remediation actions that bring the client into conformance with policy.

The above-mentioned EAC components are part of the software stacks for the HVM 220 and the MVM 250. As a more specific example, the EAC components for the MVM 250 may include Platform Trust Service (PTS) drivers 262 and an EAC agent 254. Besides the EAC components, the software stack of the MVM 250 may also include an instance of a system operating system (herein called "SOS") 260, which contains the PTS drivers 262 and is hosted by the VMM 218 Referring to FIG. 6 in conjunction with FIG. 2, in accordance with some embodiments of the invention, the SOS 260 and PTS drivers 262 are part of the O.S. layer 84; and the EAC agent 254 is part of the application layer 86. The PTS drivers 262, along with the PTS drivers of other virtual machines, are used by the platform 200 for purposes of increasing the scalability of the VMM 218.

The HVM 220 also includes a software stack with EAC components, such as an EAC agent 222 and PTS drivers 230. The PTS drivers 230 are part of an instance of a client operating system (herein called "COS") 226. The software stack for the HVM 220 also includes a PTS 224 that improves the scalability of the VMM 218. The COS 226 and the EAC agent 222 may form part of the operating system 84 and application 86 layers, respectively, in accordance with some embodiments of the invention.

Besides providing an abstraction of physical hardware 204 for the HVM 220 and the MVM 250, the VMM 218 also participates in loading software for the MVM 250, as well as participates in performing load time and run time measurements for the chain(s) of trust, as further described below.

The physical hardware 204 of the platform 200 includes such components as a dynamic random access memory (DRAM) 215, a network interface card (NIC) 216, at least one microprocessor 209 and a basic input/output operating system (BIOS) memory 206, as examples. The DRAM 215 may, for example, store program code that is executed by the microprocessor 209 for purposes of establishing the virtual environment. Thus, program code may be loaded into the DRAM 215 and executed by the microprocessor(s) for purposes of establishing the VMM 218, the HVM 220 and the MVM 250.

The BIOS memory 206, in accordance with some embodiments of the invention, stores a BIOS image for the platform 200, which includes an image called a root of trust measurement (RTM) 208. The RTM 208 forms the root of the chain of trust. Because the RTM 208 is part of the physical hardware 204, the RTM 208 is relatively immune to tampering. Additionally, in accordance with some embodiments of the invention, the RTM 208 may be stored in a protected region of the BIOS memory 206 (such as a non-flashable part of the BIOS memory 206 in embodiments in which the BIOS memory 206 is a flash memory), thereby preventing an unauthorized overwriting of the RTM 208.

The RTM 208 may be stored in other hardware 204, in accordance with other embodiments of the invention. For example, in accordance with some embodiments of the invention, the RTM 208 may be stored in the form of on-chip microcode of a microprocessor (such as the microprocessor 209) or a microcontroller of the physical hardware 204. More specifically, the RTM 208 may be stored as microcode on an on-chip cache of a microcontroller of microprocessor, in some embodiments of the invention.

In accordance with some embodiments of the invention, the physical hardware 204 also includes a trusted processor 214, which may be part of an active management technology (AMT) chipset of the platform 200. In accordance with some embodiments of the invention, the trusted processor 214 may be a microcontroller that performs only trust-related functions by executing program code that is stored in a firmware memory of the microcontroller. Other embodiments of the trusted processor 214 are possible and are within the scope of the appended claims.

The trusted processor 214 may be used in connection with run time measurements for the generation of a chain of trust. As further described below, the run time measurements begin with the trusted processor 214 and progress through the hardware and software layers of the platform 200. Therefore, similar to the load time measurements, the run time measurements are grounded in hardware.

The physical hardware 204 may also include and secure storage for storing the load and run time measurements. For example, in accordance with some embodiments of the invention, the physical hardware 204 includes a trusted platform module (TPM) 210 for secure storage of the measurements. Thus, the TPM 210 may include runtime measurement data 211 and load time management data 212. The TPM 210 may comply with the standards for a TPM, which are set forth in the specification entitled, "TCG TPM Specification," version 1.2, level 1, dated Jan. 6, 2006, which is available from the Trusted Computing Group (TCG), 5440 S.W. Westgate Drive, Step. 217, Portland, Oreg. 97221 and available on the Internet at www.trustedcomputinggroup.org.

Figure 7:
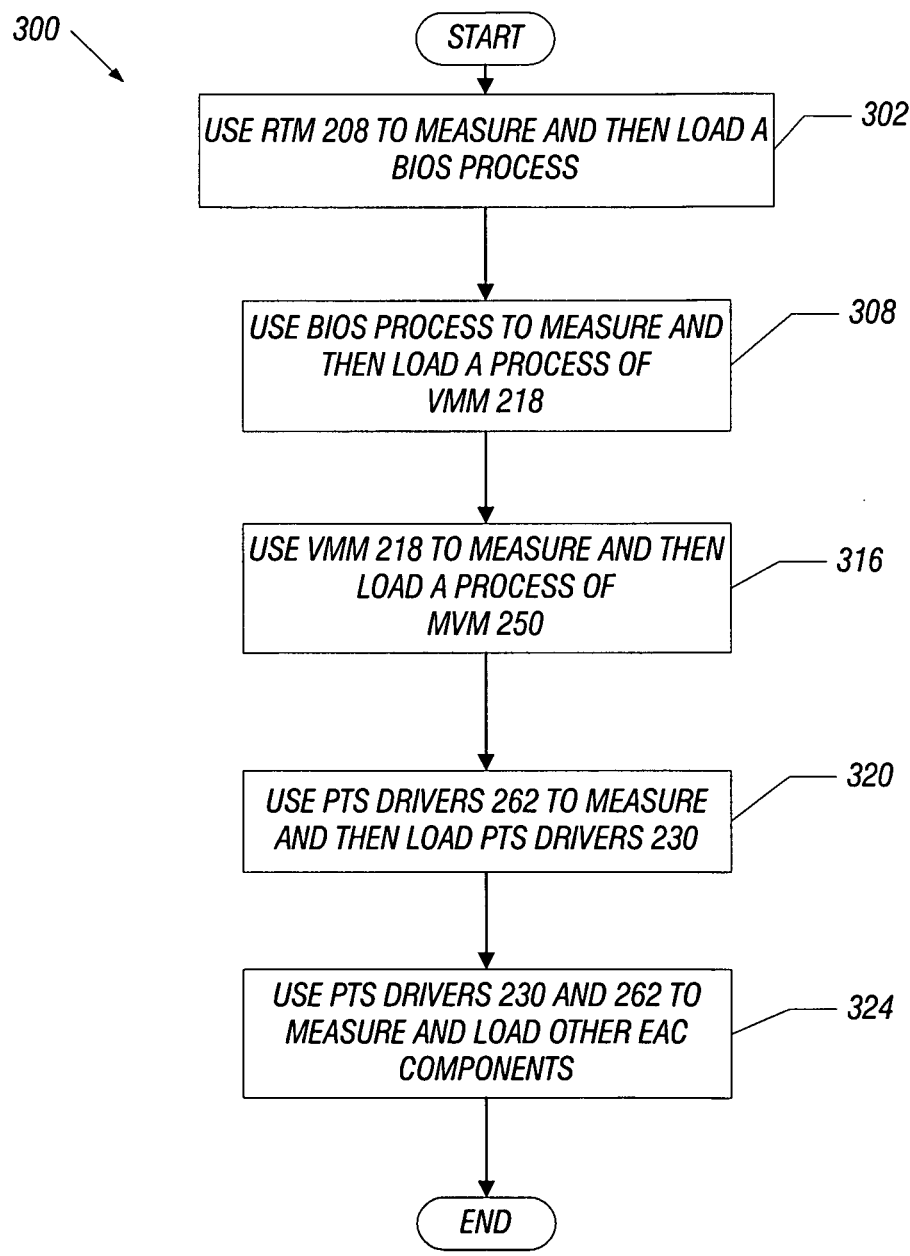
FIG. 7 is a flow diagram depicting a more detailed technique to gather load time chain of trust measurements according to an embodiment of the invention.

Referring to FIG. 7 in conjunction with FIG. 6, in accordance with some embodiments of the invention, the platform 200 may generally perform a technique 300 for purposes of performing load time chain of trust measurements. Each load time measurement is stored in the TPM 210, in accordance with some embodiments of the invention. Pursuant to the technique 300, the RTM 208 measures and then loads a BIOS process, pursuant to block 302. In other words, a microprocessor (such as the microprocessor 209) executes program code from the RTM 208 to measure data from the BIOS memory 206, and after this measurement, execution of the measured BIOS image begins. In this regard, the measurement may be a particular program code image that is stored in the BIOS memory 206 and may be a hash value that is generated from this image, in accordance with some embodiments of the invention. The measured program code image may be partially located in the RTM 208, other non-flashable portions of the BIOS memory 206 or non-flashable portions of the BIOS memory 206, depending on the particular embodiment of the invention.

Subsequently, execution of the measured BIOS process begins, an execution that causes a process of the VMM 218 to be measured and loaded, pursuant to block 308. The code image of the VMM 218 that is measured may be all or part of the code image of the VMM 218, depending on the particular embodiment of the invention. Furthermore, the code image measurement may be a hash value that is computed from the measured image of the VMM 218, depending on the particular embodiment of the invention.

After being loaded, the VMM 218 begins to execute and establish address spaces for the virtual machines, such as the HVM 220 and the MVM 250. In this manner, the VMM 218 measures and then loads a process MVM 250, pursuant to block 316, such as loading and measuring the PTS drivers 262 of the MVM 250. The PTS drivers 262 measure and then load the PTS drivers 230 of the HVM 220, pursuant to block 320. The PTS drivers 262 may, for example, use hooks in the VMM 218 to measure and load the PTS drivers 230, in accordance with some embodiments of the invention. Because the load time measurements of the PTS drivers 262 are performed in isolation via the MVM 250, intrusion by other virtual machines of the virtual environment is prevented. The PTS drivers 230 and 262 of both the HVM 220 and MVM 250 measure and then load other EAC components, pursuant to block 324.

Figure 8:
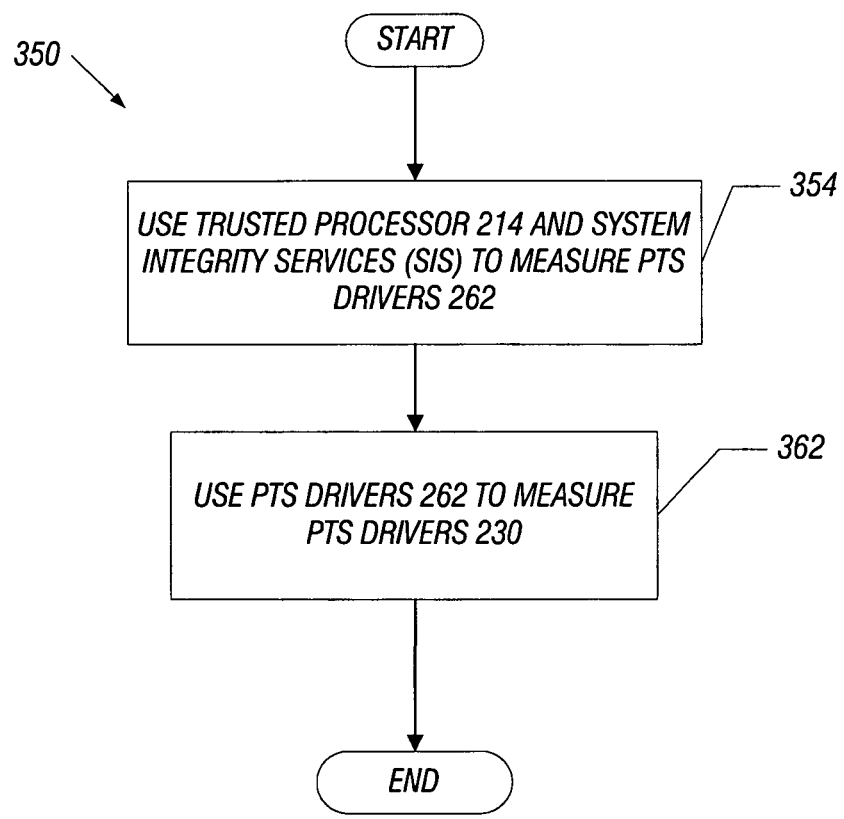
FIG. 8 is a flow diagram depicting a more detailed technique to gather run time chain of trust measurements according to an embodiment of the invention.

In accordance with some embodiments of the invention, the platform 200 may perform a technique 350, which is generally depicted in FIG. 8, for purposes of performing run time measurements. These measurements are stored in the TPM 210 (FIG. 6) as the measurements are performed. Referring to FIG. 6 in conjunction with FIG. 8, in accordance with some embodiments of the invention, the technique 350 includes using the trusted processor 214 and system integrity services (SIS) to measure the PTS drivers 262, pursuant to block 354. It is expected that the transitive trust path that is established at boot time is verified by an external verifier and runtime integrity measurement code, as the PTS, is included in the trust path. The trusted processor 214 and the SIS check the memory image of the PTS 256 in the MVM 250 for corruption/intrusion and also make sure that the PTS 256 is not terminated. The in-memory checks on the PTS drivers 262 are done in isolation in the trusted processor 214.

Pursuant to the technique 350, the PTS drivers 262 then measure (block 362) the PTS drivers 230 of the HVM 220. More particularly, the PTS drivers 262 perform memory checks on the PTS drivers 230. The PTS drivers 262 may use hooks in the VMM 218 to access the memory pages that are used by the PTS drivers 230, in accordance with some embodiments of the invention. The memory pages are measured in isolation in the MVM 250.

Among the possible advantages of the techniques and arrangements that are described herein, the grounding of the run time and load time measurements in hardware ensure that the platform has not been tampered with prior to or during load time and run time checks, thereby preventing subsequent compromises from network borne viruses and worms. The virtualization technology makes sure that the integrity measurements that are performed by the SOS instance of the PTS are done in isolation from possible attack code in the COS. The isolation properties permit run-time checking to be feasible over existing approaches, such as Integrity Verification Kernels (IVKs), which attempt to obfuscate the checker (i.e., a weak form of isolation) while running in an untrusted environment. Additionally, the construction of an integrity proof that is verifiable by a remote party is another possible advantage of the techniques and arrangements that are described herein.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
using a processor-based system to generate a chain of trust for a virtual endpoint, the virtual endpoint being associated with a layered architecture comprising layers that include a physical layer, virtual machine monitor layer, an operating system layer and an application layer; and
for each of the layers, using the processor-based system to measure a code image of a process of the layer before the process is loaded to form a node of the chain of trust, wherein:
the layers of the layered architecture have a hierarchical order, and
at least one of the layers uses a process associated with the measured code image to perform a run time measurement of one of the higher order layers.

2. The method of claim 1, further comprising:
forming a root of the chain of trust from a measurement taken of the physical layer.

3. The method of claim 1, wherein the run time measurement comprises reading a memory space accessed by said one of the higher order layers.

4. The method of claim 1, further comprising:
providing the run time measurement as posture data to a verifier to gain trust of the virtual endpoint by the verifier, wherein the run time measurement is evaluated by the verifier only after the verifier verifies the chain of trust.

5. The method of claim 1, further comprising:
providing the chain of trust to a verifier to gain trust of the virtual endpoint by the verifier.

6. The method of claim 1, further comprising:
loading the layers in concert with the generation of the chain of trust.

7. The method of claim 1, wherein the act of using the processor-based system to measure a code image of a process of each layer comprises measuring the code images beginning with measuring the physical layer and ending with measuring the application layer.

8. An apparatus comprising:
a processor-based system comprising a virtual machine and layers of a layered architecture, wherein:
the virtual machine establishes a virtual endpoint,
the layers form a chain of trust for the virtual endpoint, the layers including a physical layer and each layer to measure a code image of a process of the layer before the process is loaded to form a node of the chain of trust;
the layers of the layered architecture have a hierarchical order, and
at least one of the layers uses a process associated with the measured code image to perform a run time measurement of one of the higher order layers.

9. The apparatus of claim 8, wherein the virtual machine provides the run time measurement as posture data to a policy decision point to gain trust of the virtual endpoint by the policy decision point, wherein the run time measurement is evaluated by the policy decision point after the policy decision point verifies the chain of trust.

10. The apparatus of claim 8, wherein the virtual machine provides the chain of trust to a policy decision point to gain trust of the virtual endpoint by the policy decision point.

11. The apparatus of claim 10, wherein one of the layers comprises a virtual machine monitor layer.

12. The apparatus of claim 11, wherein the physical layer loads the virtual machine monitor, performs a measurement of the virtual machine monitor and uses the measurement of the virtual machine monitor that is part of the chain of trust.

13. The apparatus of claim 11, wherein the virtual machine monitor loads the virtual machine, performs a measurement of the virtual machine that is part of the chain of trust.

14. The apparatus of claim 10, wherein the virtual machine performs a measurement of another virtual machine to form part of a chain of trust for another virtual endpoint.

15. A system comprising:
a virtual machine to establish a virtual endpoint; and
a physical layer comprising a dynamic random access memory to store at least part of an image of the virtual machine and a non-volatile memory to store a code image of the physical layer, the physical layer to read the code image to form a root of a chain of trust for the virtual endpoint, wherein the code image comprises a measured basic input output system (BIOS) program code image,
wherein:
the physical layer is part of a layered architecture that includes layers other than the physical layer,
each of the other layers measures a code image of a process of the layer before the process is loaded to form a node of the chain of trust,
the layers of the layered architecture have a hierarchical order, and
at least one of the layers uses a process associated with the measured code image to perform a run time measurement of one of the higher order layers.

16. The system of claim 15, wherein the code image is associated with a process and the physical layer reads the code image before the process is loaded.

17. An article comprising a computer accessible storage medium storing instructions that when executed cause a computer to:
generate a chain of trust for a virtual endpoint, the virtual endpoint being associated with a layered architecture comprising layers that include a physical layer, virtual machine monitor layer, an operating system layer and an application layer, wherein the layers of the layered architecture have a hierarchical order; and
for each of the layers, measure a code image of a process of the layer before the process is loaded to form a node of the chain of trust; and
for at least one of the layers, use a process associated with the measured code image to perform a run time measurement of one of the higher order layers.

18. The article of claim 17, the storage medium storing instructions to form a root of the chain of trust from a measurement taken of the physical layer.

19. The article of claim 17, the storage medium storing instructions that when executed cause the computer to provide the run time measurement as posture data to a policy decision point to gain trust of the virtual endpoint by the policy decision point, wherein the run time measurement is evaluated by the policy decision point after the policy decision point verifies the chain of trust.

20. The article of claim 17, the storage medium storing instructions that when executed cause the computer to measure the code images beginning with measuring the physical layer and ending with measuring the application layer.

\* \* \* \* \*